(12) United States Patent
Hyun et al.

(10) Patent No.: US 10,849,476 B2
(45) Date of Patent: Dec. 1, 2020

(54) VACUUM CLEANER

(71) Applicant: LG ELECTRONICS INC., Seoul (KR)

(72) Inventors: Kietak Hyun, Seoul (KR); Seungyeop Lee, Seoul (KR); Hyukjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 16/204,215

(22) Filed: Nov. 29, 2018

(65) Prior Publication Data

US 2019/0090707 A1 Mar. 28, 2019

Related U.S. Application Data

(63) Continuation of application No. 14/924,902, filed on Oct. 28, 2015, now abandoned.

(30) Foreign Application Priority Data

Oct. 28, 2014 (KR) .................. 10-2014-0147642

(51) Int. Cl.
*B01D 50/00* (2006.01)
*A47L 9/16* (2006.01)
(Continued)

(52) U.S. Cl.
CPC ........... *A47L 9/1625* (2013.01); *A47L 9/1641* (2013.01); *A47L 9/1683* (2013.01); *B01D 45/12* (2013.01);
(Continued)

(58) Field of Classification Search
CPC .... A47L 9/1625; A47L 9/1683; A47L 9/1641; B04C 5/28; B04C 5/185; B04C 5/26;
(Continued)

(56) References Cited

U.S. PATENT DOCUMENTS

| | | | |
|---|---|---|---|
| 6,746,500 B1 | 6/2004 | Park et al. | |
| 7,273,506 B2 | 9/2007 | Oh et al. | |

(Continued)

FOREIGN PATENT DOCUMENTS

| | | |
|---|---|---|
| CN | 101023852 | 8/2007 |
| CN | 101272722 | 9/2008 |

(Continued)

OTHER PUBLICATIONS

Korean Office Action dated Nov. 20, 2015 issued in Application No. 10-2014-0147642.

(Continued)

*Primary Examiner* — Dung H Bui
(74) *Attorney, Agent, or Firm* — Ked & Associates, LLP

(57) ABSTRACT

A vacuum cleaner includes a first cyclone configured to separate dust from air introduced together with foreign objects from a lower side thereof and discharge the separated dust to a first dust storage chamber through an outlet provided at an upper portion thereof, a plurality of second cyclones arranged on an inner circumferential surface of the case and configured to separate fine dust from air which has passed through the first cyclone and discharge the separated fine dust to a second dust storage chamber differentiated from the first dust storage chamber, and a lower configured to form bottom surfaces of the first dust storage chamber and the second dust storage chamber.

10 Claims, 11 Drawing Sheets

(51) Int. Cl.
    *B04C 5/04*     (2006.01)
    *B04C 5/185*     (2006.01)
    *B04C 5/26*     (2006.01)
    *B04C 5/28*     (2006.01)
    *B01D 45/16*     (2006.01)
    *B01D 45/12*     (2006.01)

(52) U.S. Cl.
    CPC ................ *B01D 45/16* (2013.01); *B04C 5/04* (2013.01); *B04C 5/185* (2013.01); *B04C 5/26* (2013.01); *B04C 5/28* (2013.01); *B01D 50/002* (2013.01)

(58) Field of Classification Search
    CPC ........ B04C 5/04; B01D 45/16; B01D 50/002; B01D 45/12
    See application file for complete search history.

(56) References Cited

U.S. PATENT DOCUMENTS

| | | | |
|---|---|---|---|
| 7,958,598 B2 | 6/2011 | Yun et al. | |
| 7,992,252 B2 | 8/2011 | Park et al. | |
| 8,012,250 B2 | 9/2011 | Hwang et al. | |
| 8,151,409 B2 | 4/2012 | Ha et al. | |
| 8,209,815 B2 * | 7/2012 | Makarov | A47L 9/1641 15/352 |
| 8,544,143 B2 | 10/2013 | Hwang et al. | |
| 2005/0252179 A1 | 11/2005 | Oh et al. | |
| 2005/0252180 A1 | 11/2005 | Oh et al. | |
| 2006/0137304 A1 | 6/2006 | Jeong et al. | |
| 2006/0156699 A1 | 7/2006 | Kim | |
| 2006/0168922 A1 | 8/2006 | Oh | |
| 2006/0254226 A1 | 11/2006 | Jeon | |
| 2007/0079585 A1 | 4/2007 | Oh et al. | |
| 2007/0084160 A1 | 4/2007 | Kim | |
| 2007/0144116 A1 | 6/2007 | Hong et al. | |
| 2008/0023036 A1 | 1/2008 | Ha et al. | |
| 2008/0184681 A1 | 8/2008 | Oh et al. | |
| 2008/0190080 A1 | 8/2008 | Oh et al. | |
| 2008/0264007 A1 | 10/2008 | Oh et al. | |
| 2008/0264015 A1 | 10/2008 | Oh et al. | |
| 2008/0264017 A1 | 10/2008 | Oh et al. | |
| 2008/0289139 A1 | 11/2008 | Makarov et al. | |
| 2008/0289140 A1 | 11/2008 | Courtney et al. | |
| 2009/0178567 A1 | 7/2009 | Han et al. | |
| 2009/0205162 A1 | 8/2009 | Oh et al. | |
| 2009/0293224 A1 | 12/2009 | Hyun et al. | |
| 2010/0132316 A1 | 6/2010 | Ni | |
| 2010/0139033 A1 | 6/2010 | Makarov et al. | |
| 2010/0205915 A1 | 8/2010 | Oh | |
| 2010/0224073 A1 | 9/2010 | Oh et al. | |
| 2011/0000047 A1 | 1/2011 | Ji et al. | |
| 2016/0095484 A1 | 4/2016 | Hyun et al. | |

FOREIGN PATENT DOCUMENTS

| | | |
|---|---|---|
| CN | 103142191 | 6/2013 |
| EP | 1 676 515 A2 | 7/2006 |
| EP | 1 676 516 A2 | 7/2006 |
| EP | 1 980 327 A2 | 10/2008 |
| KR | 10-2007-0042849 A | 4/2007 |
| KR | 10-0846904 B1 | 7/2008 |
| KR | 10-2009-0079146 A | 7/2009 |
| KR | 10-1065968 B1 | 9/2011 |
| KR | 10-2013-0025794 A | 3/2013 |

OTHER PUBLICATIONS

European Search Report dated Apr. 5, 2016 issued in Application No. 15191661.6.
Chinese Office Action dated Jul. 3, 2017 issued in Application No. 201510711516.1 (with English translation).

\* cited by examiner

VACUUM CLEANER

CROSS-REFERENCE TO RELATED APPLICATION

This application is a Continuation Application of U.S. application Ser. No. 14/924,902, filed Oct. 28, 2015, which claims priority under 35 U.S.C. § 119 to Korean Application No. 10-2014-0147642, filed on Oct. 28, 2014, whose entire disclosures are hereby incorporated by reference.

BACKGROUND

1. Field

The present disclosure relates to a dust collecting device capable of separately collecting dust and fine dust through multiple cyclones and easily discharging collected dust, and a vacuum cleaner having the same.

2. Background

A vacuum cleaner is a device for intaking air using a suction force formed by an intake motor, separating dust, dirt or mote contained in the air from the air, and discharging clean air. Vacuum cleaners may be classified as a canister type vacuum cleaner, an upright type vacuum cleaner, a hand type vacuum cleaner, and a cylinder floor type vacuum cleaner.

The canister type vacuum cleaner is commonly used in households these days, having a scheme in which an intake nozzle and a main body communicate with each other by a connection pipe. The canister type vacuum cleaner, which includes a vacuum cleaner body, a hose, a pipe, and a brush, performs cleaning only with a suction force, and thus, it is appropriate for cleaning an uncarpeted floor.

In contrast, the upright type vacuum cleaner is a vacuum cleaner in which an intake nozzle and a main body are integrally formed. The upright type vacuum cleaner includes a rotary brush, and thus, it may clean even dust in a carpet, unlike the canister type vacuum cleaner.

No matter what type a vacuum cleaner it is, when the currently distributed vacuum cleaners finishes cleaning, dust (foreign objects, dirt, motes, and the like) collected in a dust collecting device should be discarded. It is not desirable to discharge dust to an unintended place in the process of discharging dust from the dust collecting device. However, the related art vacuum cleaners have various problems.

First, in the related vacuum cleaners, as dust sticks to a filter, a phenomenon in which a portion of dust to be separated by the filter is not separated occurs. Dust stuck to the filter hinders movement of fine dust, causing a problem in which dust and fine dust are tangled together in the filter, and in a case in which dust is discharged from the dust collecting device, dust stuck to the filter and the tangled dust are not easily separated. Dust stuck to the filter hinders a flow of air, reducing overall efficiency of the vacuum cleaner.

The related art vacuum cleaner also has a limitation in providing user convenience even in a dust discharge process. Some vacuum cleaners are left with dust blowing in the process of discharging dust, or others require an excessively complicated process to discharge dust.

A dust collecting device capable of providing sufficient user convenience in the process of discharging dust, and a vacuum cleaner having the same need to be considered.

BRIEF DESCRIPTION OF THE DRAWINGS

The embodiments will be described in detail with reference to the following drawings in which like reference numerals refer to like elements wherein.

DETAILED DESCRIPTION

Figure 1:
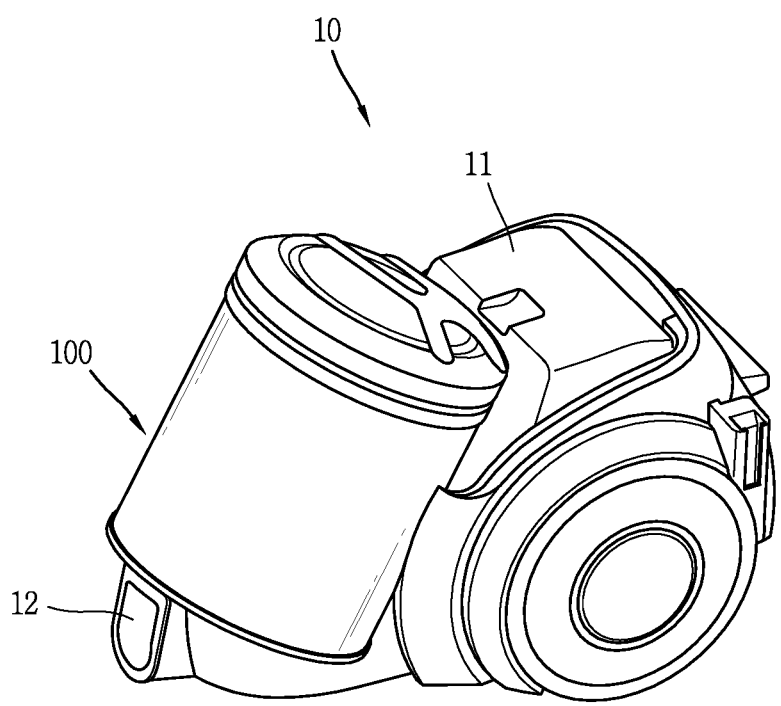
FIG. 1 is a conceptual view illustrating a vacuum cleaner body related to an embodiment of the present disclosure.

As illustrated in FIG. 1, the vacuum cleaner 10 includes a vacuum cleaner body 11 including a vacuum motor generating a suction force therein. The vacuum cleaner 10 may further include an intake nozzle for intaking air containing foreign objects and a connection pipe connecting the intake nozzle to the vacuum cleaner body 11. In an embodiment of the present disclosure, basic configurations of the intake nozzle and the connection pipe are the same as those of the related art, and thus, a description thereof will be omitted.

An intaking unit 12 is formed at a lower end portion of a front surface of the vacuum cleaner body 11 and intakes air intaken through the intaking nozzle and foreign objects included in the air. Air and the foreign objects are introduced to the intake portion 12 according to an operation of the vacuum motor. The air and the foreign objects introduced to the intake portion 12 are introduced to a dust collecting device 100 and separated from each other in the dust collecting device 100.

Figure 2:
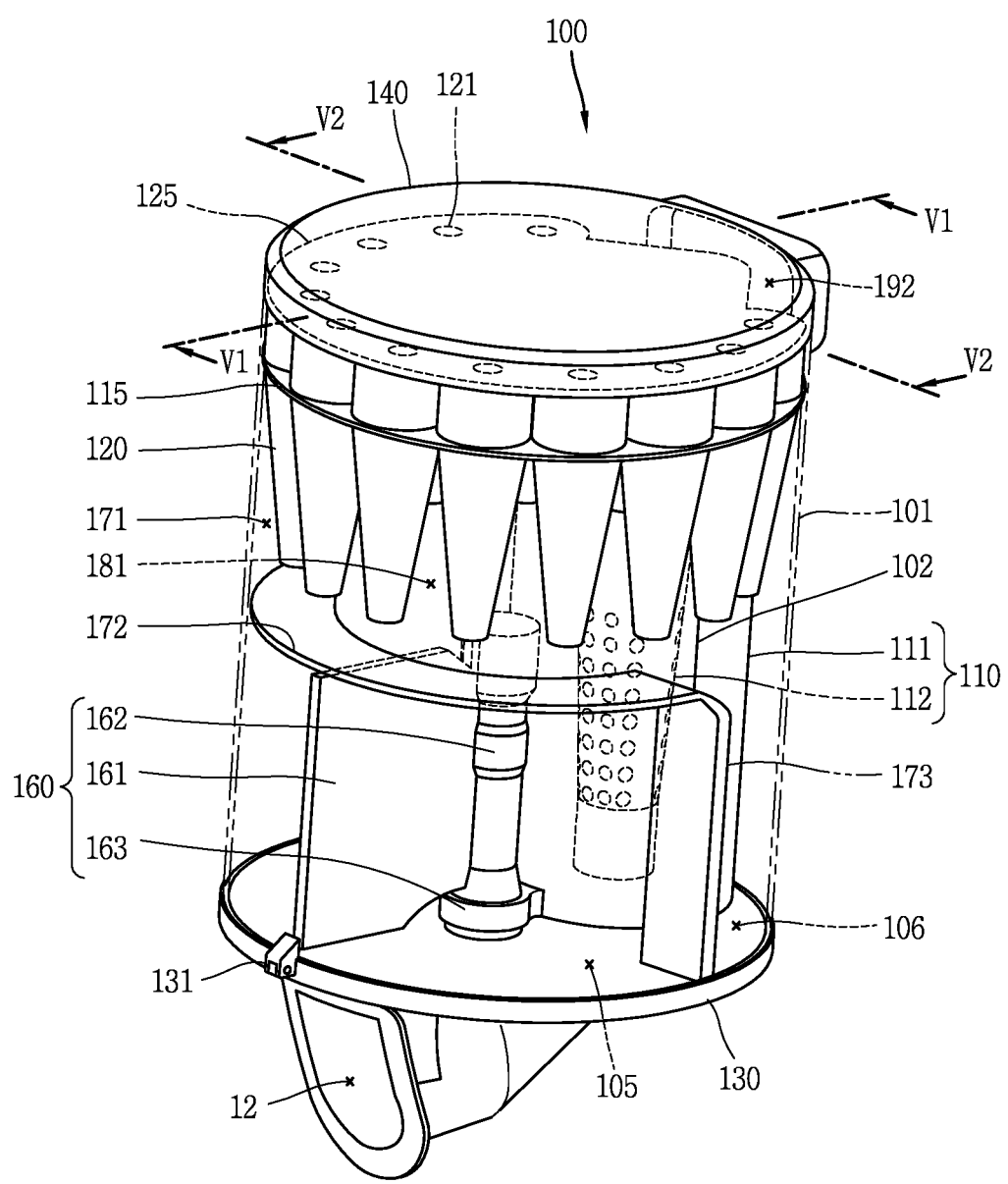
FIG. 2 is a perspective view of a dust collecting device related to an embodiment of the present disclosure.

The dust collecting device or collector 100 is detachably installed in the vacuum cleaner body 11. The dust collecting device 100 is configured to separate the foreign objects from the intaken air and collect dust. As shown in FIG. 2, a case 101 forms an outer appearance of the dust collecting device 100. The case 101 has a cylindrical shape, but the present disclosure is not limited thereto.

A first cyclone 110 is installed within the case 101. The first cyclone 110 is configured to separate dust from air introduced together with foreign objects from a lower side and discharge the separated dust to a first dust storage unit 105. The first cyclone 110 includes a housing 111 and a mesh filter or cyclone filter 112 having a mesh or hole pattern.

The housing 111 has a hollow portion to accommodate the mesh filter 112. For example, the housing 111 may have a cylindrical shape, like the case 101. The housing 111 may be installed to be eccentric from the center of the case 101. As illustrated in FIG. 2, a rotational shaft 162 is installed at the center of the case 101, and the housing 111 may be installed at one side of the rotational shaft 162.

The mesh filter 112 is installed within the housing 111. The mesh filter 112 is formed to separate dust from air introduced to the interior of the housing 111. The mesh filter 112 has a plurality of holes allowing air and fine dust to pass therethrough. The mesh filter 112 extends in a direction parallel to a direction in which the housing 111 extends.

Air and foreign objects may be introduced to the interior of the first cyclone 110 through the intake portion 12 and an inlet 191 of the dust collecting device 100. The foreign objects included in the air may be divided into dust and fine dust smaller and lighter than the dust. The first cyclone 110 separates dust from the air by using a centrifugal force. Dust, which is heavier than fine dust, gyrates along an outer circumferential surface of the housing 111 and is discharged to the first dust storage unit 105.

A structure in which dust is discharged to the first dust storage unit 105 will be described with reference to FIG. 3. Air and fine dust, which are lighter than dust, pass through the holes of the mesh filter 112, rise along the hollow portion or interior of the mesh filter 112, and are discharged from the first cyclone 110 and introduced to the second cyclone 120. A structure in which air and fine dust are introduced to the second cyclone 120 will be described with reference to FIGS. 4, 5, and 7.

A plurality of second cyclones 120 are arranged along an inner circumferential surface of the case 101. For example, the second cyclones 120 may be arranged, drawing a circle along the inner circumferential surface of the case 101 formed to have a cylindrical shape. Upper portions of the plurality of second cyclones 120 may be disposed to be adjacent to each other.

The second cyclones 120 are disposed to extend in a direction parallel to the direction in which the first cyclone 110 extends. The direction in which the second cyclones 120 extend may be substantially parallel to the direction in which the first cyclone 110 extends. The direction in which the cyclones extend may be understood as a direction in which a straight line linking an upper end and a lower end of the cyclones is oriented.

The second cyclones 120 may be configured to separate fine dust from air which has passed through the first cyclone 110 and discharge the separated fine dust to the second dust storage unit 106. A principle of the second cyclones 120 is the same as that of the first cyclone 110. Air lighter than fine dust is discharged to an outlet 192 of the dust collecting device 100. In order to separate ultra-fine dust, which has not been separated yet from the air, a filter (not shown) covering a vortex outlet 121 may be additionally provided. Fine dust heavier than air gyrates within the second cyclone 120 and discharged to a lower outlet of the second cyclone 120. Fine dust is collected to the second dust storage unit 106.

A lower cover unit or a lower cover 130 is coupled to the case 101 by a hinge 131 to form bottom surfaces of the first dust storage unit 105 and the second dust storage unit 106. The first dust storage unit 105 and the second dust storage unit 106 are maintained to be airtight by means of the lower cover unit 130. Dust and fine dust are accumulated on the lower cover unit 130.

The lower cover unit 130 is rotated by the hinge 131 to simultaneously open the first dust storage unit 105 and the second dust storage unit 106 such that dust and fine dust may be simultaneously discharged. When the lower cover unit 130 is rotated by the hinge 131 so the first dust storage unit 105 and the second dust storage unit 106 are simultaneously opened, a user may simultaneously discharge dust and fine dust. In an embodiment of the present disclosure, there is no need to separately open the first dust storage unit 105 and the second dust storage unit 106, and dust and fine dust may be discharged together through a single operation.

An upper cover unit or upper cover 140 is coupled to the top of the dust collecting device 100. An outlet 192 may be formed at one side of the cover unit 140. Air discharged to the vortex outlet of the second cyclone 120 is discharged from the dust collecting device 100 through the outlet 192.

The dust collecting device 100 includes a first partition plate 115 and a second partition plate 125 partitioning an inner space of the dust collecting device 100. The first partition plate 115 and the second partition plate 125 serve to discriminate flow paths of air from each other and prevent dust or fine dust separated from the air from being mixed with air again. The first partition plate 115 and the second partition plate 125 will be described hereinafter.

Dust introduced to the first dust storage unit 105 is compressed by a compressing device 160. The compressing device 160 reciprocates within the case 101 to compress dust collected to the first dust storage unit 105. The compressing device 160 includes a blade 161, a rotational shaft 162, and a fixed portion 163.

The blade 161 reciprocates to compress dust collected in the first storage unit 105. While the vacuum cleaner 10 operates, the blade 161 may continuously reciprocate around the rotational shaft 162. Dust collected in the first dust storage unit 105 is compressed in a region of the first dust storage unit 105 by the blade 161.

The rotational shaft 162 is connected to the blade 161. The rotational shaft 162 forms a central axis of rotation of the blade 161. When the rotational shaft 162 rotates, the blade 161 connected to the rotational shaft 162 may rotate around the rotational shaft 162.

The fixed portion or base 163 may be formed to relatively rotate with respect to the rotational shaft 162. The fixed portion 163 is coupled to an outer circumferential surface of the housing 111. Since the fixed portion 163 is coupled to the housing 111, the lower cover unit 130 is rotated by the hinge 131, and thus, even though the lower cover unit 130 is rotated by the hinge 131 so the first dust storage unit 105 is opened, the blade 161 and the rotational shaft 162 may be fixed in place.

The first dust storage unit 105 and the second dust storage unit 106 are discriminated or distinct from each other. The dust collecting device 100 includes an internal case 102 installed within the case 101 to partition the first dust storage unit 105 and the second storage unit 106 from each other. The first dust storage unit 105 and the second dust storage unit 106 partitioned by the internal case 102 is illustrated in detail with reference to FIG. 3.

Figure 3:
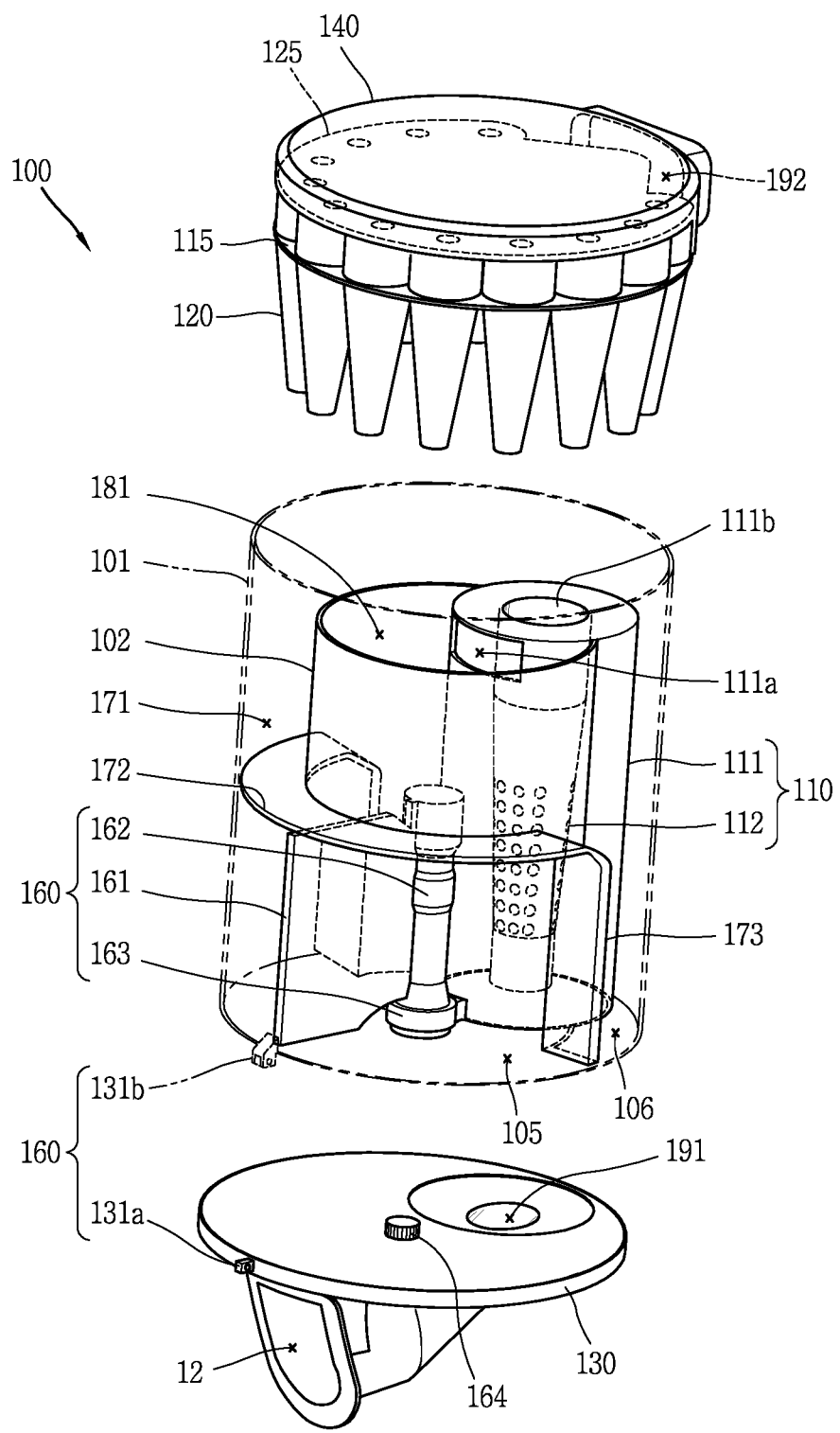
FIG. 3 is a disassembled perspective view of the dust collecting device illustrated in FIG. 2.

As shown in FIG. 3, an inlet of the dust collecting device 100 is formed on the lower cover unit 130 such that is communicates with the internal space of the first cyclone 110. The inlet of the dust collecting device 100 is provided to be eccentric from the center of the first cyclone 110 in order to induce a gyrational movement of air introduced to the first cyclone 110. This structure may be more clearly checked in FIG. 6.

The first cyclone 110 is configured to separate dust from air and discharge dust to the first storage unit 105 through an outlet 111a formed at an upper portion. The housing 111 has the outlet 111a to communicate with the first dust storage unit 105. The outlet 111a may be formed by cutting out or removing at least a portion of the housing 111.

Passing through the first cyclone 110, air and fine dust which are relatively light, are released upwardly from the first cyclone 110 through the hollow portion or holes of the mesh filter 112, and distributed to the plurality of second cyclones 120. In contrast, relatively heavy dust is discharged from the first cyclone 110 through the outlet 111a.

The internal case 102 is formed to have an inner diameter smaller than that of the case 101, and is installed within the case 101. The internal case 102 is configured to partition the inner space of the case 101. For example, within the internal case 102, a dust flow channel 181 and a fine dust flow channel 171 are discriminated or distinct.

The internal case 102 may also have a cylindrical shape, like the case 101. However, the shape of the internal case 102 is not limited thereto. Referring to FIG. 3, the dust flow channel 181 is formed above the first storage unit 105, and the fine dust flow channel 171 is formed at the circumference of the dust flow channel 181. A radius or diameter of the dust flow channel 181 is smaller than that of the first dust storage unit 105.

The dust flow channel 181 is formed in a space surrounded by the internal case 102. The dust flow channel 181 is defined by the internal case 102. The internal case 102 links the outlet 111a and the first dust storage unit 105. Dust discharged through the outlet 111a of the first cyclone 110 is collected to the first dust storage unit 105 through the dust flow channel 181.

An inner diameter of the mesh filter 112 is gradually narrowed downwardly. In an embodiment of the present disclosure, a bottom surface of the first dust storage unit 105 is formed by the lower cover unit 130. Thus, the lower cover unit 130 is rotated by the hinges 131a and 131b so the first cyclone 110 is opened, dust or fine dust stuck to the first cyclone 110 may also be discharged to the outside through the opened portion. Since the inner diameter of the mesh filter 112 is configured to be gradually narrowed downwardly, dust or fine dust stuck to the mesh filter 112 may be easily separated from the mesh filter 112 so as to be discharged.

The fine dust flow channel 171 is formed between the internal case 102 and the case 101. The fine dust flow channel 171 is formed at the circumference of the dust flow channel 181. The fine dust flow channel 171 links a lower outlet of the second cyclone 120 and the second dust storage unit 106. Fine dust discharged through the lower outlet of the second cyclone 120 is collected to the second dust storage unit 106 through the fine dust flow channel 171.

The second dust storage unit 106 is surrounded by the housing 111 of the first cyclone 110 and the case 101 so as to be formed at both sides of the housing 111. Fine dust is discharged from the second cyclone 120 and introduced to the second dust storage unit 106 through the fine dust flow channel 171. The second dust storage unit 106 is configured to store fine dust introduced through the fine dust flow channel 171. The structures of the first dust storage unit 105 and the second dust storage unit 106 may be more clearly recognized with reference to FIG. 6.

A sloped portion 172 and a step portion 173 are formed at the fine dust flow channel 171. The sloped portion or an inclined ledge 172 forms a bottom surface of the fine dust flow channel 171. As illustrated, the sloped portion 172 is installed in a space between the case 101 and the internal case 102. The sloped portion 172 is formed to be sloped to induce a movement of fine dust discharged from the second cyclone 120 to the fine dust flow channel 171, to the second dust storage unit 106.

In FIGS. 2 and 3, it is illustrated that the sloped portion 172 is not formed to have a slope in structure. However, when the dust collecting device 100 is coupled to the vacuum cleaner body 11, the sloped structure of the sloped portion 172 may be conformed with reference to FIG. 1.

Referring back to FIG. 1, the dust collecting device 100 is coupled to the vacuum cleaner body 11, and the dust collecting device 100 is coupled in a sloped state to the vacuum cleaner body 11.

Referring to FIG. 3, in a state in which the dust collecting device 100 is coupled to the vacuum cleaner body 11, the sloped portion 172 is sloped with respect to the ground. Fine dust discharged through the lower outlet of the second cyclone 120 slides on the sloped portion 172 by gravitation so as to be collected in the second dust storage unit 106.

The step portion or steep downward surface 173 forms, together with the internal case 102, a boundary between the first dust storage unit 105 and the second dust storage unit 106. This structure may be checked in FIG. 6. The step portion 173 extends from the sloped portion 172 to the lower cover unit 130 to form a step of the fine dust flow channel 171 and the second dust storage unit 106. Thus, fine dust sliding from an upper portion of the sloped portion 172 may be dropped from the step portion 173 by gravitation so as to be collected in the second dust storage unit or chamber 106.

The step portion 173 is formed at both sides of the housing 111, and due to the step portion 173, a step is formed at the second dust storage unit 106 and the sloped portion 172. Fine dust collected in the second dust storage unit 106 is maintained in a state of being collected in the second dust storage unit 106 before the second dust storage unit 106 is opened by the bottom cover unit, rather than being returned to the fine dust flow channel 171.

The compressing device 160 compresses dust collected by the first dust storage unit 105 to a region adjacent to the step portion 173. As described above, the dust collecting device 100 is coupled in a sloped state to the vacuum cleaner body 11, and here, the step portion 173 is disposed in a position relatively lower in the first dust storage unit 105. Due to the operation of the compressing device 160, dust may be compressed to a region adjacent to the step portion 173. As discussed above, the dust collecting device is, in a state of being sloped, coupled to the vacuum cleaner body 11, and here, the step portion 173 is disposed in a position relatively lower in the first dust storage unit 105. According to an operation of the compressing device 160, dust may be compressed to a region adjacent to the step portions 173 at both sides, and maintained in the compressed state due to gravitation.

At least a portion of the compressing device 160 penetrates through the lower cover unit 130 so as to be exposed to the outside of the dust collecting device 100. In this case, a configuration in which the rotational shaft 162 penetrates through the lower cover unit 130 may also be provided, and as illustrated in FIG. 3, a gear 164 may be installed on the lower cover unit 130 and the rotational shaft 162 may be coupled to the gear 164. When the gear 164 is installed on the lower cover unit 130, the gear 164 may be configured to be relatively rotatable with respect to the lower cover unit 130. Regardless of the configuration, at least a portion of the compressing device 160 is to be configured to be relatively rotatable with respect to the lower cover unit 130, and a sealing member may be additionally provided to seal the first dust storage unit or chamber 105.

When the dust collecting device 100 is coupled to the vacuum cleaner body 11, the compressing device 160 is engaged with a gear of the vacuum cleaner body 11 (please refer to FIG. 1) so as to be rotated. The gear of the vacuum cleaner body 11 receives driving power from a driving unit of the vacuum cleaner body 11. The driving unit of the vacuum cleaner body 11 includes, for example, a motor. When a repulsive force is applied in a direction opposite to a direction in which the motor rotates, the motor may change a rotation direction to the opposite direction. The motor of the driving unit is differentiated from an intake motor.

The driving power transmitted to the gear of the vacuum cleaner body 11 is also transmitted to the compressing device 160. The gear 164 of the dust collecting device 100 is rotated by the driving power transmitted through the gear of the vacuum cleaner body 11. Accordingly, the rotational shaft 162 and the blade 161 are also rotated.

When the driving unit (for example, a motor) of the vacuum cleaner body 11 described above receives a repulsive force in a direction opposite to the rotation direction providing the driving force, the driving unit may change a rotation direction into the opposite direction. When the rotation direction of the driving unit is changed to the opposite direction, the rotation directions of the rotational shaft 162 and the blade 161 may also be changed to the opposite direction.

Figure 4:
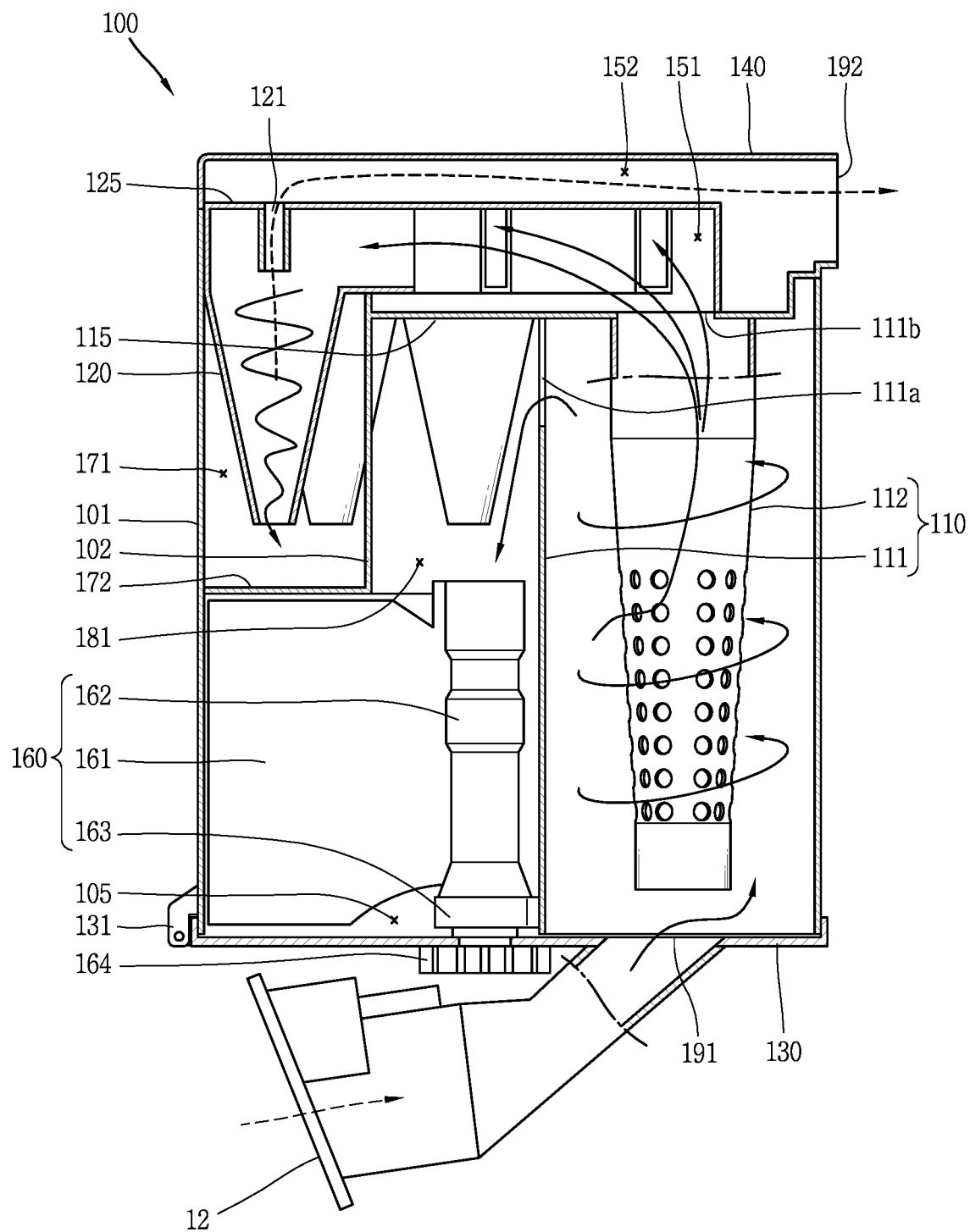
FIG. 4 is a vertical cross-sectional view of the dust collecting device of FIG. 2, taken along line V1-V1.

A process of separating a foreign object from air will be described with reference to the vertical cross-sectional view of the dust collecting device 100. FIG. 4 is a vertical cross-sectional view of the dust collecting device 100, taken along line V1-V1. FIG. 4 is a vertical sectional view of the dust collecting device 100 taken to illustrate the first dust storage unit 105.

Air and foreign objects are introduced to the dust collecting device through an inlet of the dust collecting device 100 connected to the intake portion 12. The air and the foreign objects first pass through the first cyclone 110.

The air and the foreign objects introduced to the interior of the first cyclone 110 gyrate within the housing 111 so as to be lifted. Dust relatively heavy due to centrifugal force gyrates in a space between the mesh filter 112 and the housing 111 and is discharged through the outlet 111a at an upper portion of the first cyclone 110. Dust is dropped to pass through the dust flow channel 181 and collected in the first dust storage unit 105. The compressing device 160 compresses the dust collected in the first dust storage unit 105.

The relatively light air and fine dust pass through the holes of the mesh filter 112 installed within the housing 111 and rise through the hollow portion of the mesh filter 112. The air and the fine dust are discharged through an upper portion of the mesh filter 112, an outlet of the first cyclone 110.

The first partition plate 115 forms a boundary between a connection flow channel 151 and the dust flow channel 181 in order to prevent air discharged from the first cyclone 110 from being introduced to the first dust storage unit 105. The first partition plate 115 also prevents dust collected in the first dust storage unit 105 from being introduced to the connection flow channel 151.

The connection flow channel 151 connects the outlet 111b of the first cyclone 110 and the inlet of the second cyclone 120 such that a flow of air discharged from the first cyclone 110 is distributed to the plurality of second cyclones 120. Air and fine dust pass through the connection flow channel 151 so as to be introduced to the second cyclones 120.

The air and the fine dust are separated from each other according to the principle the same as that of the first cyclone 110. Relatively heavy fine dust is discharged to the outlet at the lower portion of the second cyclone 120. The fine dust discharged to the outlet at the lower portion of the second cyclone 120. The fine dust discharged to the outlet at the lower portion of the second cyclone 120 slides on the sloped portion 172 of the fine dust flow channel 171 so as to be collected to the second dust storage unit 106.

The relatively light air is discharged to the vortex outlet 121 of the second cyclone 120 and discharged to the outlet 192 of the dust collecting device 100. As described above, a filter (not shown) covering the vortex outlet 121 may be additionally provided to filter ultra-fine dust which has not been separated yet from air.

The second partition plate 125 partitions a space between the connection flow channel 151 and the upper cover unit 140 in order to prevent air discharged from the second cyclone 120 from being introduced to the connection flow path 151. With respect to the vertical sectional view, it may be divided such that the first dust storage unit 105 is a first layer, the connection flow channel 151 is a second layer, and the discharge flow channel 152 through which air is discharged is a third layer. A bottom surface of the first dust storage unit 105 as the first layer is formed by the lower cover unit 130. A boundary between the first layer and the second layer is formed by the first partition plate 115, and a boundary between the second layer and the third layer is formed by the second partition plate 125.

Figure 5:
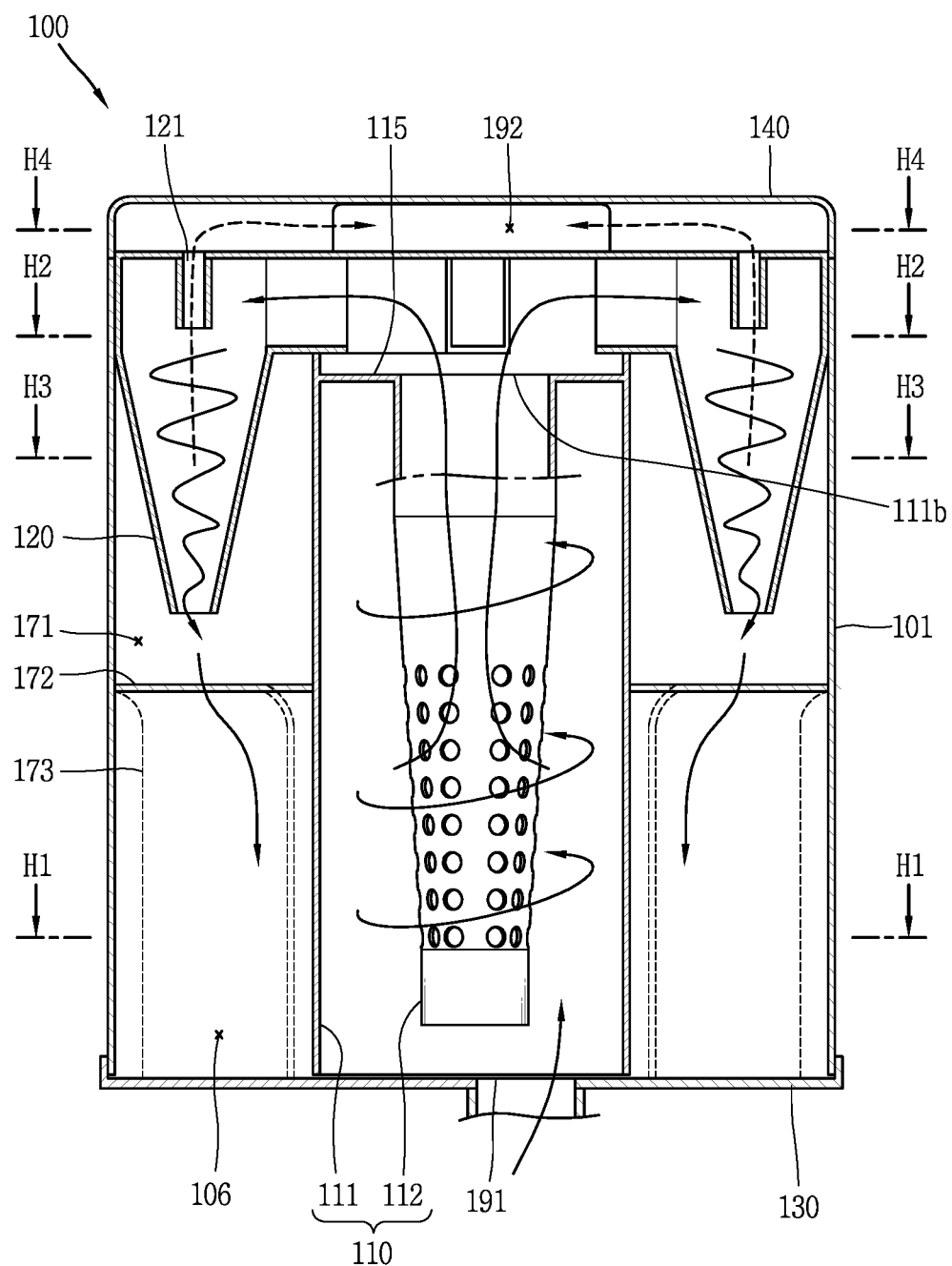
FIG. 5 is a vertical cross-sectional view of the dust collecting device of FIG. 2, taken along line V2-V2.

FIG. 5 is a vertical cross-sectional view of the dust collecting device 100 of FIG. 2, taken along line V2-V2. FIG. 2 is a vertical cross-sectional view of the dust collecting device 100 taken to illustrate the second dust storage unit 106. A process in which air is introduced to the interior of the dust collecting device 100 and filtered by the first cyclone 110 and the second cyclone 120 is the same as that described above with reference to FIG. 4. In FIG. 5, the second dust storage unit 106 not illustrated in FIG. 4 is illustrated.

Fine dust discharged through the outlet at the lower portion of the second cyclone 120 slides on the sloped portion 172 of the fine dust flow channel 171 so as to be dropped and collected in the second dust storage unit 106. The second dust storage unit 106 may be formed at both sides of the housing 111.

The other components and an operation of the dust collecting device 100 are the same as those described above with reference to FIG. 4, and thus, a description thereof will be omitted.

Hereinafter, a process of separating foreign objects from air will be described with reference to the vertical cross-sectional view of the dust collecting device 100. A movement of air flow may be checked in the vertical cross-sectional view, but a detailed structure of some components of the dust collecting device cannot be checked therein, and thus, the detailed structure which is not easily checked in the vertical cross-sectional view may be checked in the following cross-sectional view.

Figure 6:
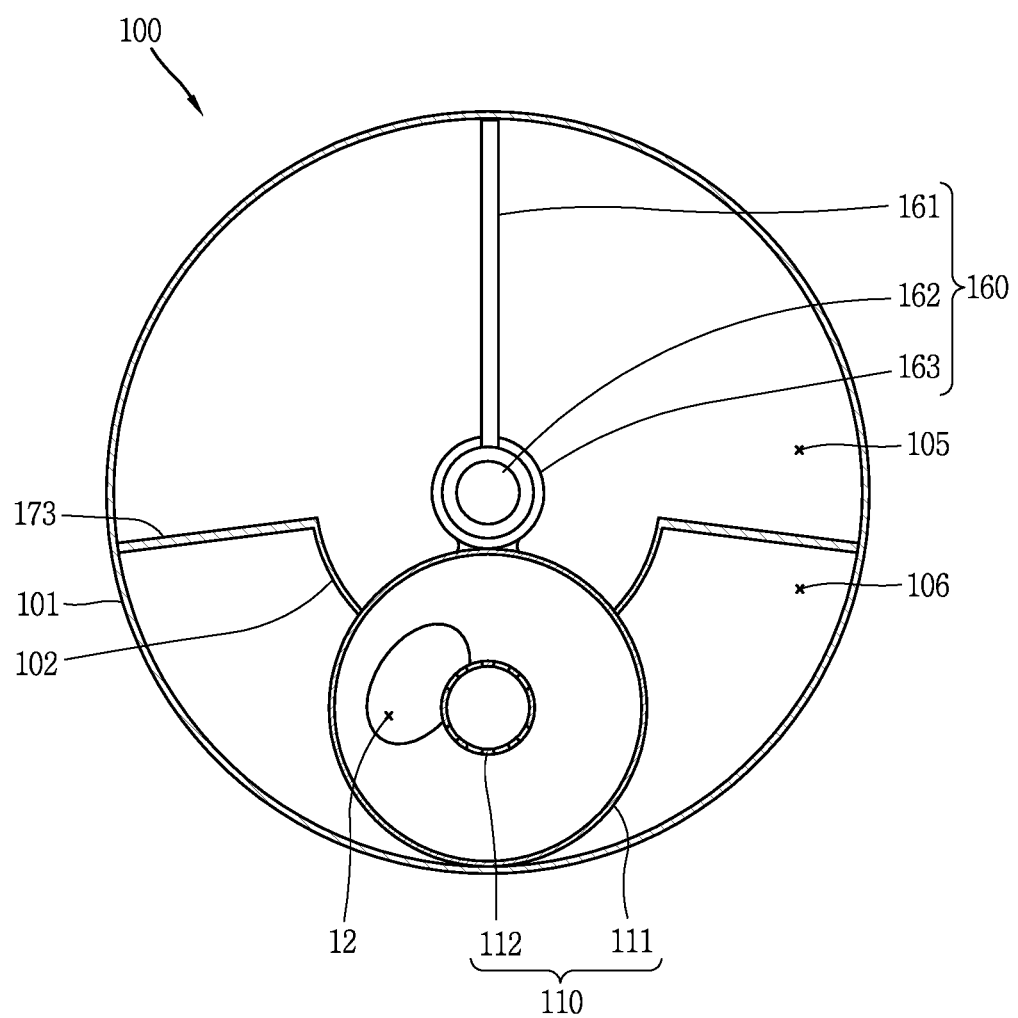
FIG. 6 is a vertical cross-sectional view of the dust collecting device of FIG. 5, taken along line H1-H1.

FIG. 6 is a vertical cross-sectional view of the dust collecting device 100 of FIG. 5, taken along line H1-H1. The case 101 has a cylindrical shape. The first cyclone 110 is disposed to be eccentric within the case 101. The first cyclone 110 includes the housing 111 and the mesh filter 112. The housing 111 has a hollow portion, and the mesh filter 112 is installed in the hollow portion.

An inlet 12 of the dust collecting device 100 is also disposed to be eccentric from the center of the housing 111. Since the inlet of the dust collecting device 100 is eccentric, air introduced to the interior of the housing 111 may gyrate within the housing 111.

The compressing device 160 is installed in the first dust storage unit 105. The rotational shaft 162 is installed at the center of the case 101. The fixed portion 163 is fixed to the housing 111. The blade 161 is configured to reciprocate between step portions 173 at both sides. Thus, dust stored in the first dust storage unit 105 is compressed to a region adjacent to the step portions 173 at both sides.

The internal case 102 connects the step portions 173 and the case 101. The first dust storage unit 105 and the second dust unit 106 are formed to partition an internal space of the case 101. Edges of the first dust storage unit 105 and the second dust storage unit 106 are formed by the case 101. The first dust storage unit 105 and the second dust storage unit 106 are partitioned with respect to the step portions 173 by the internal case 102.

Figure 7:
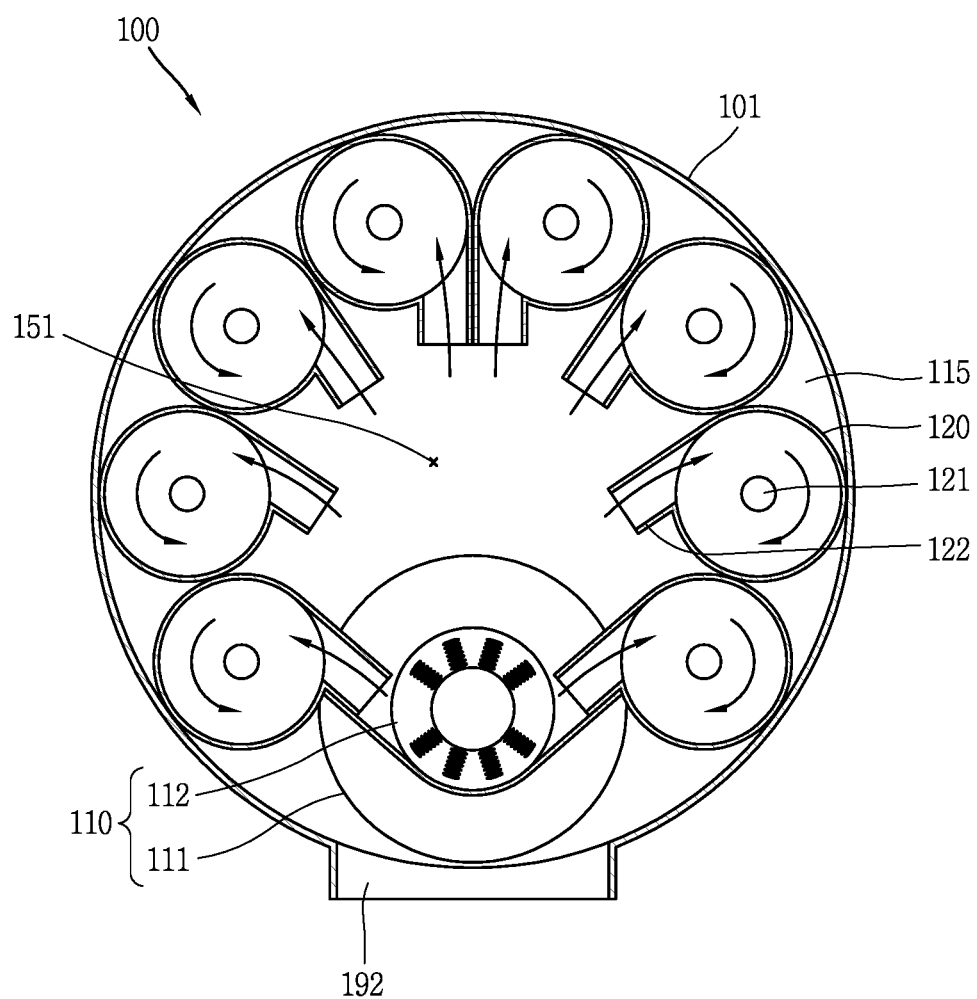
FIG. 7 is a vertical cross-sectional view of the dust collecting device of FIG. 5, taken along line H2-H2.

FIG. 7 is a vertical cross-sectional view of the dust collecting device 100 of FIG. 5, taken along line H2-H2. An upper portion of the housing 111 is closed, the hollow portion of the mesh filter 112 is opened (please refer to FIG. 3). Air and fine dust discharged from the hollow portion of the mesh filter 112 are distributed to the second cyclones 120 through the connection flow channel 151. A bottom surface of the connection flow channel 151 is formed by the first partition plate 115.

The vortex outlet 121 is formed at the center of the second cyclone 120. In order to guide flow of air introduced to the second cyclone 120, at least a portion of the guide flow channel 122 is formed to protrude from the inlet of the second cyclone 120. Air and fine dust distributed to the second cyclone 120 gyrate in the second cyclone 120 so as to be separated from each other.

In FIG. 7, the outlet 192 of the dust collecting device 100 is illustrated, and here, the connection flow channel 151 and the outlet 192 of the dust collecting device 100 are closed such that they cannot communicate with each other. Thus, fine dust is not discharged to the outlet 192 of the dust collecting device 100.

Figure 8:
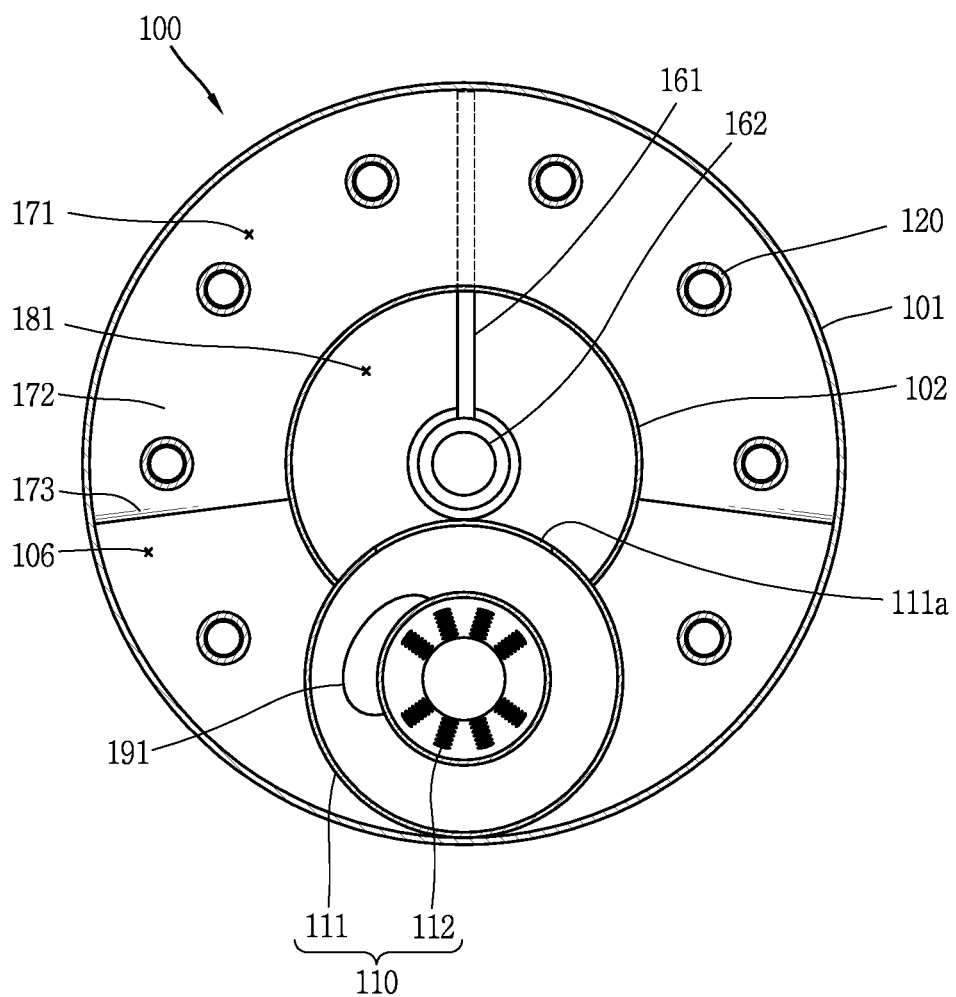
FIG. 8 is a vertical cross-sectional view of the dust collecting device of FIG. 5, taken along line H3-H3.

FIG. 8 is a vertical cross-sectional view of the dust collecting device 100 of FIG. 5, taken along line H3-H3. The housing 111 includes the outlet 113*a* discharging dust to the dust flow channel 181. The other components have been described above, and thus, a description thereof will be omitted.

Fine dust discharged to the fine dust flow channel 171 through the outlet at the lower portion of the second cyclone 120 slides on the sloped portion 172 and is dropped from the step portion 173 so as to be collected to the second dust storage unit 106. Referring to FIG. 8, the dust flow channel 181 is formed in a space defined by the internal case 102, and the fine dust flow channel 171 is formed in a space between the internal case 102 and the case 101.

Figure 9:
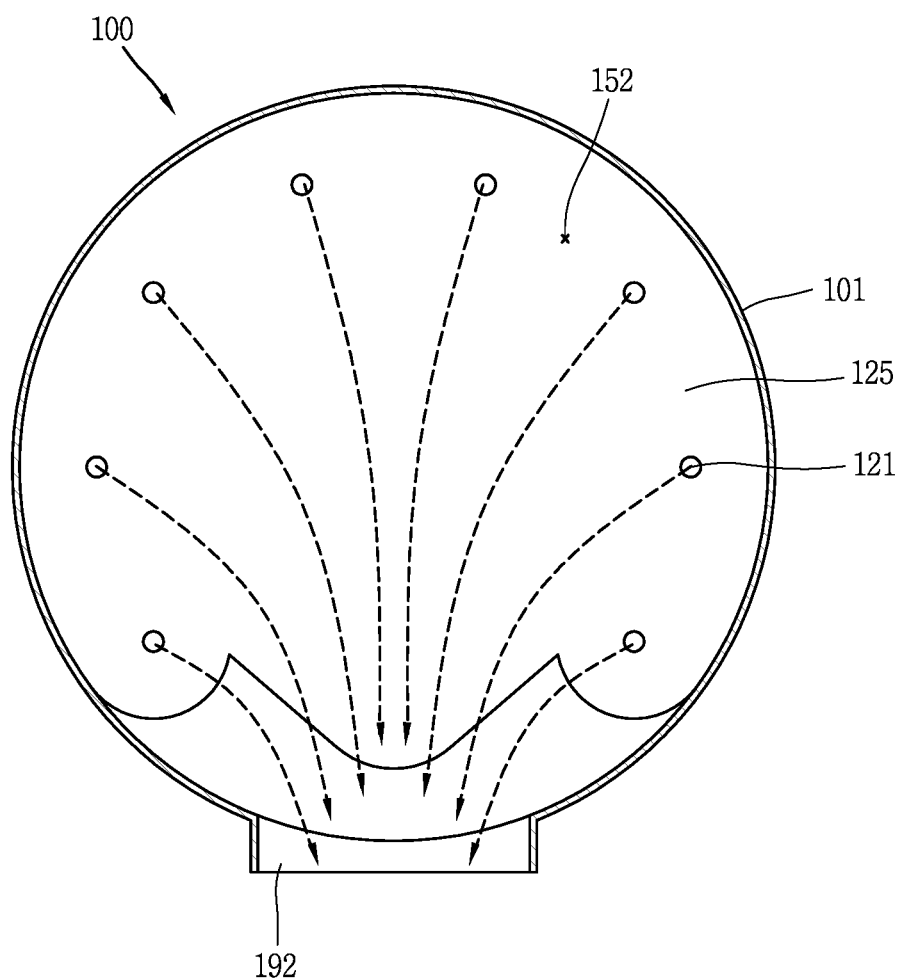
FIG. 9 is a vertical cross-sectional view of the dust collecting device of FIG. 5, taken along line H4-H4.

FIG. 9 is a vertical cross-sectional view of the dust collecting device 100 of FIG. 5, taken along line H4-H4. Air discharged to the vortex outlet 121 of the second cyclone 120 is released to the outlet 192 of the dust collecting device 100 through the discharge flow channel 152. A bottom surface of the discharge flow channel 152 is formed by the second partition plate 125. Since the discharge flow channel 152 is discriminated from other flow channels by the second partition plate 125, it is not possible for air discharged to the vortex outlet 121 of the second cyclone 120 to flow to the interior of the dust collecting device 100 again.

Figure 10:
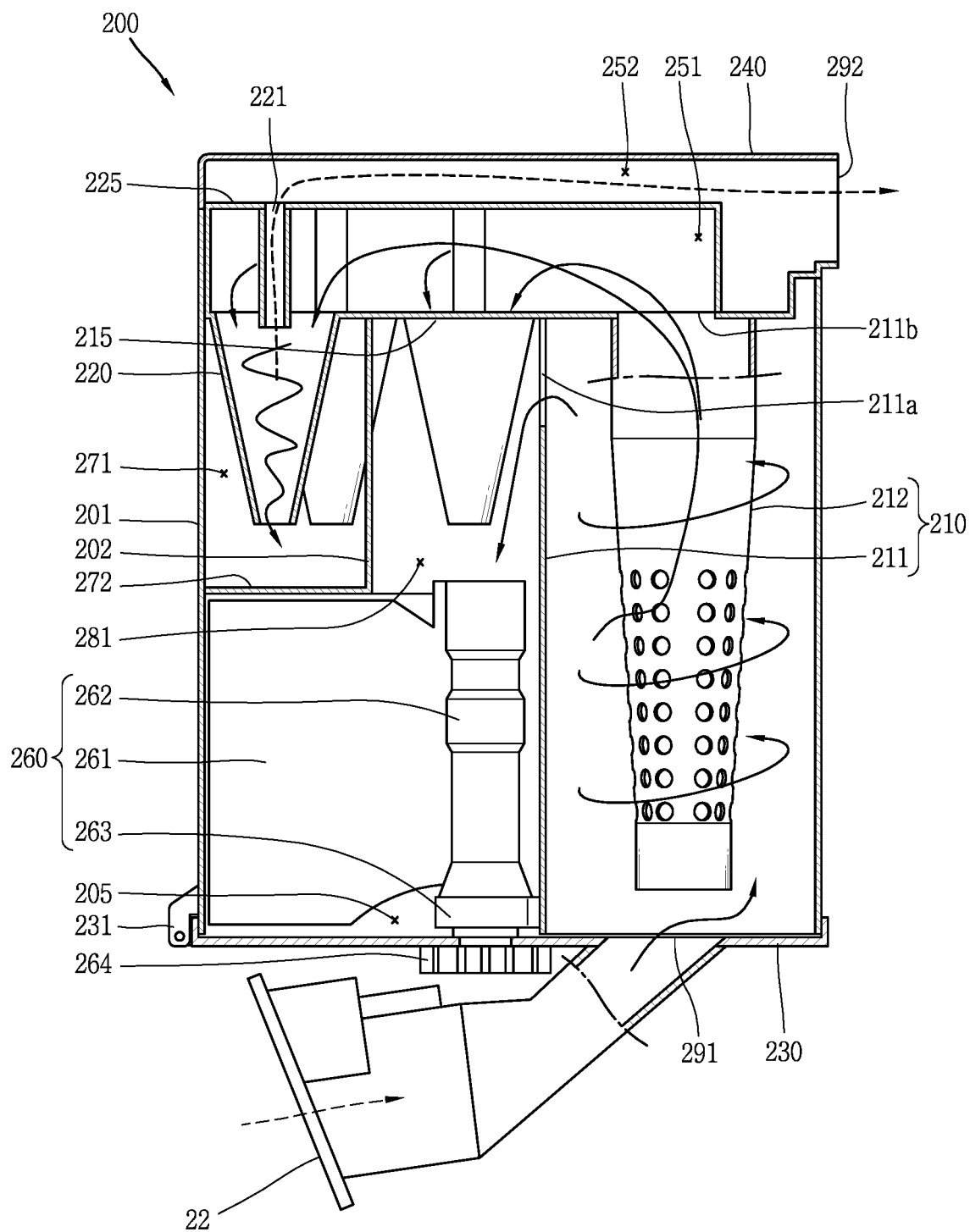
FIGS. 10 and 11 are vertical cross-sectional view illustrating another embodiment of a dust collecting device.
Figure 11:
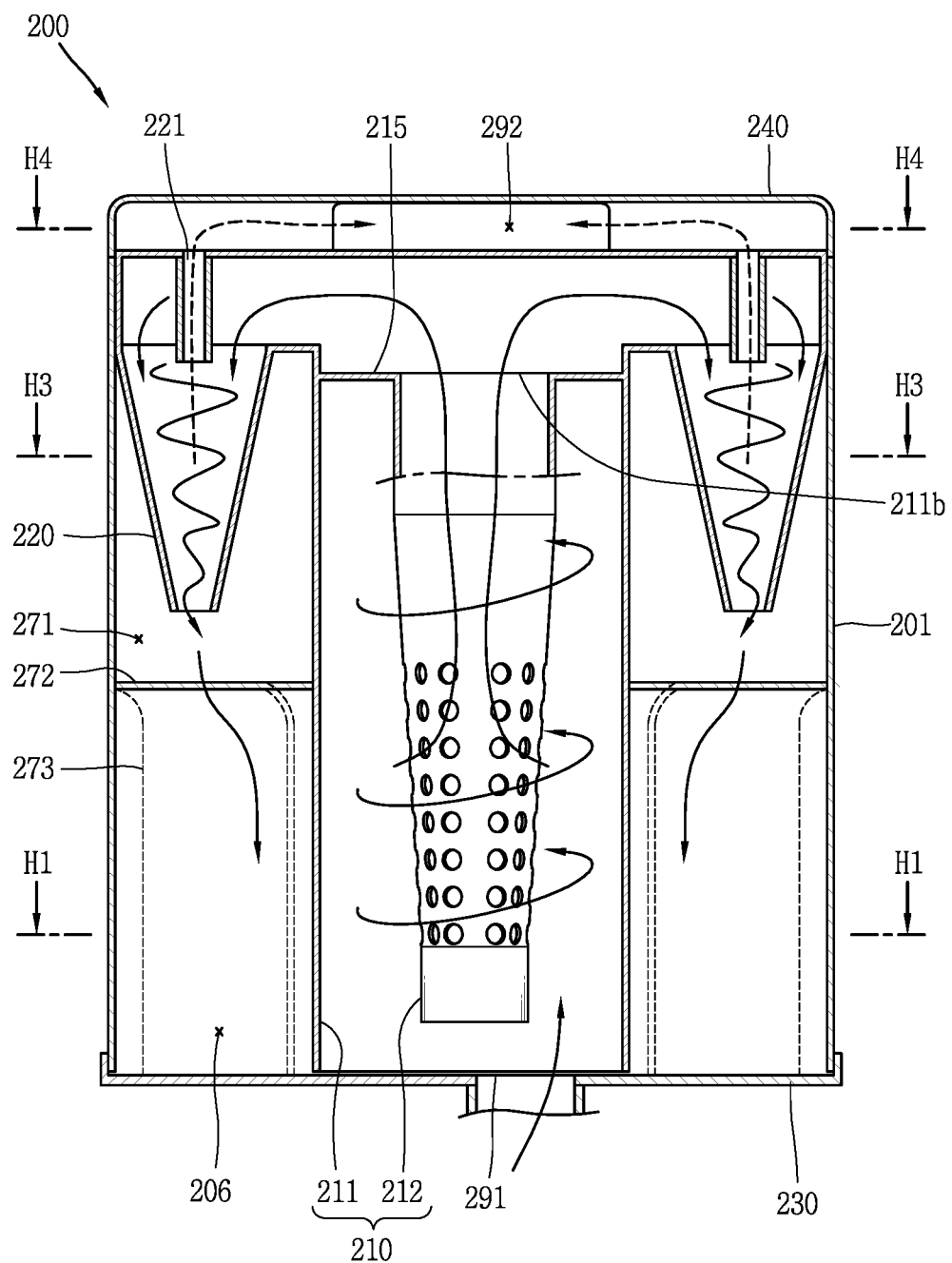

FIGS. 10 and 11 are vertical cross-sectional view illustrating another embodiment of a dust collecting device 200. The dust collecting device 200 illustrated in FIG. 10 is similar to the dust collecting device 100 illustrated in FIG. 4. The dust collecting device 200 illustrated in FIG. 11 is substantially similar to the dust collecting device 100 illustrated in FIG. 5. Thus, hereinafter, only differences between the dust collecting devices will be described.

In the dust collecting device 100 illustrated above with reference to FIGS. 4 and 5, air and fine dust which have passed through the first cyclone 110 are introduced to the side surface of the second cyclone 120. However, in the dust collecting device 200 illustrated in FIGS. 10 and 11, air and fine dust which have passed through the first cyclone 210 are dropped from the upper portion of the second cyclone 220 to the interior of the second cyclone 220.

The inlet of the second cyclone 220 is opened in a vertical direction. The inlet of the second cyclone 220 is formed at the circumference of the vortex outlet 221. Due to this structure, air and fine dust may be dropped from the upper portion of the second cyclone to the interior of the second cyclone 220.

A mechanism in which fine dust is separated from air by the second cyclone 220 is the same as that described above. Thus, the redundant description thereof will be omitted. Descriptions of the other components will be replaced with the description of FIGS. 4 and 5 in which the substantially same reference numerals are denoted.

Unexplained reference numeral, 22 is an intaking unit, 201 is a case, 202 is an internal case, 205 is a first dust storage unit, 206 is a second dust storage unit, 211 is a housing, 211*a* is an outlet, 211*b* is an outlet, 212 is a mesh filter, 215 is a first partition plate, 225 is a second partition plate, 230 is a lower cover unit, 231 is a hinge, 240 is an upper cover unit, 251 is a connection flow channel, 252 is a discharge flow channel, 260 a compressing device, 261 is a blade, 262 is a rotational shaft, 263 is a fixed portion, 264 is a gear, 271 is a fine dust flow channel, 272 is a sloped portion, 273 is a step portion, 281 is a dust flow channel, 291 is an inlet, and 292 is an outlet.

According to the embodiments of the present disclosure, since the first dust container and the second dust container are opened at a time by using the lower cover unit, dust collected and compressed in the first dust container and fine dust collected and compressed in the second dust container may be simultaneously discharged. In particular, since dust and fine dust are compressed by the compressing device, the dust and fine dust may be easily dropped from the dust collecting device by gravitation and the user may more easily discharge dust and fine dust. Since dust can be compressed by the compressing device, scattering of collected dust can be prevented.

The present disclosure provides a dust collecting device allowing user convenience and a vacuum cleaner having the same.

A vacuum cleaner has a structure capable of separately collecting dust and fine dust and simultaneously discharging the collected dust and fine dust.

A vacuum cleaner has a structure capable of compressing dust to facilitate discharging of dust.

A vacuum cleaner may include: a first cyclone installed within a case forming an outer appearance of a dust collecting device and configured to separate dust from air introduced together with foreign objects from a lower side thereof and discharge the separated dust to a first dust storage unit through an outlet provided at an upper portion thereof; a plurality of second cyclones arranged on an inner circumferential surface of the case and configured to separate fine dust from air which has passed through the first cyclone and discharge the separated fine dust to a second dust storage unit differentiated from the first dust storage unit; and a lower cover unit coupled to the case by a hinge, configured to form bottom surfaces of the first dust storage unit and the second dust storage unit, and configured to be rotated by the hinge to simultaneously open the first dust storage unit and the second storage unit such that the dust and the fine dust are simultaneously discharged.

The first cyclone may include: a housing installed to be eccentric from the center of the case and configured to have an outlet configured to communicate with the first dust storage unit; and a mesh filter installed within the housing, configured to extend in a direction parallel to a direction in which the housing extends, and configured to separate dust from air introduced to the interior of the housing.

An inner diameter of the mesh filter may be gradually narrowed downwardly from an upper portion thereof.

The vacuum cleaner may further include: an internal case formed to have an inner diameter smaller than that of the case and installed within the case; a dust flow channel formed in a space surrounded by the internal case and configured to link the outlet and the first dust storage unit; and a fine dust flow channel formed between the internal case and the case and configured to link outlets of the plurality of second cyclones and the second dust storage unit.

The second dust storage unit may be surrounded by the housing and the case and formed at both sides of the housing, and configured to store fine dust introduced through the fine dust flow channel after being discharged from the plurality of second cyclones.

The vacuum cleaner may further include: a connection flow channel configured to link an outlet of the first cyclone and inlets of the plurality of second cyclones in order to distribute a flow of air discharged from the first cyclone to the plurality of second cyclones; and a guide flow channel formed such that at least a portion thereof protrudes from the inlets of the plurality of second cyclones in order to guide a flow of air introduced to the plurality of second cyclones.

The vacuum cleaner may further include: a first partition plate configured to form a boundary between the connection flow channel and the dust flow channel in order to prevent air discharged from the first cyclone from being introduced to the first dust storage unit; and a second partition plate configured to partition a space between the connection flow channel and an upper cover unit in order to prevent air discharged from the plurality of second cyclones from being introduced to the connection flow channel.

The vacuum cleaner may further include: a sloped portion configured to form a bottom surface of the fine dust flow channel and sloped to induce a movement of fine dust discharged from the plurality of second cyclones to the fine dust flow channel, to the second dust storage unit; and a step portion configured to form a boundary between the first dust storage unit and the second dust storage unit together with the internal case, and configured to extend from the sloped portion to the lower cover unit to form a step between the fine dust flow channel and the second dust storage unit.

The vacuum cleaner may further include: a compressing device configured to reciprocate within the case to compress dust collected to the first dust storage unit to a region adjacent to the step portion.

The compressing device may include: a blade configured to reciprocate to compress dust collected by the first dust storage unit; a rotational shaft connected to the blade and configured to form a rotation central axis of the blade; and a fixed portion formed to be relatively rotatable with respect to the rotational shaft and coupled to an outer circumferential surface of the housing.

The compressing device may penetrate through the lower cover unit so as to be exposed to the outside of the dust collecting device, and when the dust collecting device is coupled to a vacuum cleaner body, the compressing device may be engaged with a gear of the vacuum cleaner body so as to be rotated.

According to another example related to the present disclosure, the plurality of second cyclones may extend in a direction parallel to a direction in which the first cyclone extends.

According to another example related to the present disclosure, the first cyclone and the plurality of second cyclones may be disposed to form a circle.

According to another example related to the present disclosure, an inlet of the dust collecting device may be formed at the lower cover unit to communicate with an inner space of the first cyclone, and disposed to be eccentric from the center of the first cyclone in order to induce a gyrational movement of air introduced to the first cyclone.

As can be appreciated, the singular forms "a", "an" and "the" are intended to include the plural forms as well, unless the context clearly indicates otherwise.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cleaner comprising:
   a first cyclone provided in a case forming an outer appearance of a dust collector device and configured to separate dust from air introduced together with foreign objects from a lower side thereof and discharge the separated dust to a first dust storage chamber through an outlet provided at an upper portion thereof;
   a plurality of second cyclones arranged on an inner circumferential surface of the case and configured to separate fine dust from air which has passed through the first cyclone and discharge the separated fine dust to a second dust storage chamber distinct from the first dust storage chamber;
   a lower cover coupled to the case by a hinge, configured to form bottom surfaces of the first dust storage chamber and the second dust storage chamber, and configured to be rotated by the hinge to simultaneously open the first dust storage chamber and the second storage chamber such that the dust and the fine dust are simultaneously discharged;
   an internal case formed to have an inner diameter smaller than that of the case and provided within the case;
   a ledge provided between the case and the internal case;
   a step portion provided between the case and the internal case and extending between the ledge and the lower cover;

a dust flow channel formed in a space surrounded by the internal case and configured to link the outlet and the first dust storage chamber;
a fine dust flow channel formed between the internal case and the case and configured to link outlets of the plurality of second cyclones and the second dust storage chamber a compression plate configured to reciprocate within the case to compress dust collected to the first dust storage chamber to a region adjacent to the step portion; and
a compression plate configured to reciprocate within the case to compress dust collected to the first dust storage chamber to a region adjacent to the step portion,
wherein:
the first cyclone includes a housing installed to be eccentric from a central axis of the case and configured to have an outlet configured to communicate with the first dust storage chamber,
the first dust storage chamber is provided between the case, an inner surface of the internal case, a first portion of the housing, the ledge, and the step portion,
the second dust storage chamber is provided between the case, an outer surface of the internal case, a second portion of the housing, a upper surface of the ledge, and the step portion,
the ledge is configured to form a bottom surface of the fine dust flow channel and is configured to be sloped to induce a movement of fine dust, discharged from the plurality of second cyclones to the fine dust flow channel, to the second dust storage chamber,
the step portion is configured to form a boundary between the first dust storage chamber and the second dust storage chamber together with the internal case,
the compression plate includes:
a blade configured to reciprocate to compress dust collected in the first dust storage chamber;
a rotational shaft connected to the blade and configured to form a rotation central axis of the blade; and
a base formed to be relatively rotatable with respect to the rotational shaft and coupled to an outer circumferential surface of the housing, and
the base of the compression plate penetrates through the lower cover so as to be exposed to the outside of the dust collector device, and when the dust collector device is coupled to a vacuum cleaner body, the compression plate receives a driving force so as to be rotated.

2. The vacuum cleaner of claim 1,
wherein a mesh filter is installed within the housing, configured to extend in a direction parallel to a direction in which the housing extends, and configured to separate dust from air introduced to the interior of the housing.

3. The vacuum cleaner of claim 2, wherein an inner diameter of the mesh filter is gradually narrowed downwardly from an upper portion thereof.

4. The vacuum cleaner of claim 1, wherein the second dust storage chamber is configured to store fine dust introduced through the fine dust flow channel after being discharged from the plurality of second cyclones.

5. The vacuum cleaner of claim 1, further comprising:
a connection flow channel configured to link an outlet of the first cyclone and inlets of the plurality of second cyclones in order to distribute a flow of air discharged from the first cyclone to the plurality of second cyclones; and
a guide flow channel formed such that at least a portion thereof protrudes from the inlets of the plurality of second cyclones in order to guide a flow of air introduced to the plurality of second cyclones.

6. The vacuum cleaner of claim 5, further comprising:
a first partition plate configured to form a boundary between the connection flow channel and the dust flow channel in order to prevent air discharged from the first cyclone from being introduced to the first dust storage chamber; and
a second partition plate configured to partition a space between the connection flow channel and an upper cover unit in order to prevent air discharged from the plurality of second cyclones from being introduced to the connection flow channel.

7. The vacuum cleaner of claim 1, wherein the plurality of second cyclones extend in a direction parallel to a direction of the first cyclone.

8. The vacuum cleaner of claim 1, wherein the first cyclone and the plurality of second cyclones are arranged to form a circle.

9. The vacuum cleaner of claim 1, wherein an inlet of the dust collector device is formed at the lower cover to communicate with an inner space of the first cyclone, and is provided to be eccentric from the center of the first cyclone in order to induce a gyrational movement of air introduced to the first cyclone.

10. A vacuum cleaner comprising:
a first cyclone provided in a case forming an outer appearance of a dust collector device and configured to separate dust from air introduced together with foreign objects from a lower side thereof and discharge the separated dust to a first dust storage chamber through an outlet provided at an upper portion thereof;
a plurality of second cyclones arranged on an inner circumferential surface of the case and configured to separate fine dust from air which has passed through the first cyclone and discharge the separated fine dust to a second dust storage chamber distinct from the first dust storage chamber;
a lower cover coupled to the case by a hinge, configured to form bottom surfaces of the first dust storage chamber and the second dust storage chamber, and configured to be rotated by the hinge to simultaneously open the first dust storage chamber and the second storage chamber such that the dust and the fine dust are simultaneously discharged;
an internal case formed to have an inner diameter smaller than that of the case and provided within the case;
a ledge provided between the case and the internal case;
a step portion provided between the case and the internal case and extending between the ledge and the lower cover;
a dust flow channel formed in a space surrounded by the internal case and configured to link the outlet and the first dust storage chamber;
a fine dust flow channel formed between the internal case and the case and configured to link outlets of the plurality of second cyclones and the second dust storage chamber a compression plate configured to reciprocate within the case to compress dust collected to the first dust storage chamber to a region adjacent to the step portion; and a compression plate configured to reciprocate within the case to compress dust collected to the first dust storage chamber to a region adjacent to the step portion, wherein:
- an air inlet to the first cyclone is provided on the lower cover, and is eccentric from a central axis of the first cyclone,
- the first cyclone includes a housing having the outlet,
- the first dust storage chamber is provided between the case, an inner surface of the internal case, a first portion of the housing, a lower surface of the ledge, and the step portion, and
- the second dust storage chamber is provided between the case, an outer surface of the internal case, a second portion of the housing, a upper surface of the ledge, and the step portion,
- the ledge is configured to form a bottom surface of the fine dust flow channel and is configured to be sloped to induce a movement of fine dust, discharged from the plurality of second cyclones to the fine dust flow channel, to the second dust storage chamber,
- the step portion is configured to form a boundary between the first dust storage chamber and the second dust storage chamber together with the internal case,
- the compression plate includes:
  - a blade configured to reciprocate to compress dust collected in the first dust storage chamber;
  - a rotational shaft connected to the blade and configured to form a rotation central axis of the blade; and
  - a base formed to be relatively rotatable with respect to the rotational shaft and coupled to an outer circumferential surface of the housing, and
- the base of the compression plate penetrates through the lower cover so as to be exposed to the outside of the dust collector device, and when the dust collector device is coupled to a vacuum cleaner body, the compression plate receives a driving force so as to be rotated.

* * * * *